United States Patent
Wagle

[15] 3,693,424
[45] Sept. 26, 1972

[54] RING TESTING MACHINE
[72] Inventor: Joseph A. Wagle, Indianapolis, Ind.
[73] Assignee: General Motors Corporation, Detroit, Mich.
[22] Filed: Oct. 21, 1970
[21] Appl. No.: 82,614

[52] U.S. Cl..........................................73/120, 73/95
[51] Int. Cl..................................................G01n 3/08
[58] Field of Search....................................73/120, 95

[56] References Cited

UNITED STATES PATENTS

| 1,457,933 | 6/1923 | Peterson | 73/120 |
| 1,036,448 | 8/1912 | Campbell | 73/120 |
| 3,391,635 | 7/1968 | Matheus | 254/93 R X |
| 1,933,354 | 10/1933 | Teetor | 73/120 |
| 1,513,610 | 10/1924 | Laessker | 73/120 |
| 1,332,571 | 3/1920 | Ray | 73/120 |

FOREIGN PATENTS OR APPLICATIONS

| 183,986 | 12/1966 | U.S.S.R. | 73/120 |

Primary Examiner—Jerry W. Myracle
Attorney—Paul Fitzpatrick and Jean L. Carpenter

[57] ABSTRACT

Ring testing machines which embody an annular frame, a ring of jacks, and tension members extending in from the jacks to a ring to be tested. The tension members may be coupled to shoes to fit the inside of the ring to be tested or the ring may be clamped so that the jacks exert a delaminating or separating pull on the radially outer portion of the ring. Heat may be applied to the ring during the testing.

3 Claims, 6 Drawing Figures

INVENTOR.
Joseph A. Wagle
BY
Paul Fitzpatrick
ATTORNEY

PATENTED SEP 26 1972 3,693,424

INVENTOR.
Joseph A. Wagle
BY
Paul Fitzpatrick
ATTORNEY

RING TESTING MACHINE

The invention herein described was made in the course of work under a contract or subcontract thereunder with the Department of Defense.

DESCRIPTION

My invention relates to devices for testing rings by exerting a radially outward pull on the rings at a considerable number of areas distributed around the circumference of the ring. While particularly intended for testing and research in fiber-reinforced or laminated structures, the tester is applicable to testing of rings of various materials.

The principal objects of my invention are to provide a simple and versatile machine for exerting a radially outward pull or stretching stress on continuous rings. A further object is to test the structural strength of rings of various materials. A still further object is to provide a ring testing machine which may be easily fabricated from readily available components. A still further object is to provide means for heating a ring while placing it under tension.

The nature of my invention and its advantages will be clear to those skilled in the art from the succeeding detailed description of preferred embodiments of the invention and the accompanying drawings thereof.

Figure 1:
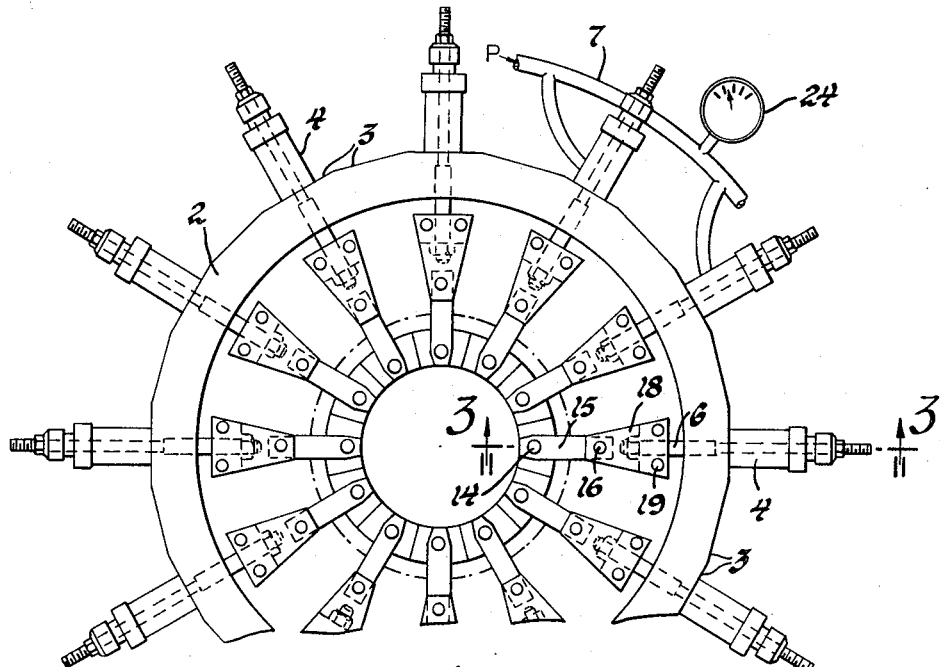
FIG. 1 is a plan view of a first form of testing machine.

Referring first to FIG. 1, the testing machine comprises a rigid ring-shaped frame 2 which specifically has a cylindrical interior surface and a 24-sided regular polygonal outer surface which provides 24 flats 3. As shown, 12 jacks in the form of hydraulic piston and cylinder devices are distributed evenly around the periphery of the frame 2. Each jack 4, which will be referred to hereafter as a cylinder, includes a piston rod 6 which extends from both ends of the cylinder and a piston (not shown). A connection to supply hydraulic fluid under pressure to the cylinders is indicated at 7 and the pressure fluid by the legend P. Such fluid connections are made to all the cylinders, and these are normally connected in parallel to a controllable pressure source variable from zero to preferably about 5,000 psi so that the force exerted by each of the cylinders is equal. Since there are 24 flats, 24 cylinders may be employed, or twelve, or eight, for example, there being a radial bore 8 through the frame 2 at the location of each of the flats. In the form of FIG. 1, the inner end of each cylinder bears directly against the outer surface of the frame 2 and the inner end of the piston rod 6 is guided in the bore 8.

The ring to be tested is indicated at 10. This is located coaxially with the frame 2. Means for detachably connecting the piston rod 6 to the ring 10 to pull outwardly upon it comprises an arcuate shoe 11, the outer surface 12 of which very closely equals the radius of the interior of the ring 10. The length of the shoe is determined by the radius and the number to be employed. As shown in FIG. 1, each shoe must extend through substantially 30° of arc so that these shoes are in close proximity before the tensile force is applied to the piston rod. Shoes appropriate to various diameter rings may be provided. Each shoe 11 is coupled by a cylindrical pin 14 to two links 15 which pass on either side of the test piece 10. Links 15 are coupled by a cylindrical pin 16 to two trapezoidal links 18 which are coupled by two cylindrical pins 19 to a block 20. The block 20 has a bore through which the inner end of the piston rod 6 passes, the piston rod being removably coupled to the block by a nut 22 threaded on the end of the piston rod. This threaded connection provides also for a measure of adjustment of the position of the shoe 11 to accommodate some variation in the size of the rings. Flexible shims or filler strips may be inserted between the shoes and the ring to adapt the shoes to a somewhat larger ring diameter. As will be apparent, the number of shoes and cylinders may be doubled to 24, if desired. The cylinders 4 are a commercial product and the shoes, links, pins, and blocks by which the cylinders are coupled to the ring 10 being tested are a simple and easily manufactured and assembled structure. The pins 14, 16, and 19 may be retained by cotter pins, as illustrated. The broken line 23 in the drawings illustrates the accommodation of a ring of larger overall dimension within the machine. In operation, the shoes may be disposed inside the ring 10, for example, by removing pin 16 and then recoupling the device at the pin 16. Then, by applying hydraulic pressure to the cylinders 4, the stretching force on the ring may be increased as desired. The magnitude of the force may be indicated by a gauge 24 showing the hydraulic pressure applied. The stretching of the ring may be measured by any suitable gauge such as a wrap extensometer or strain gauge.

Figure 3:
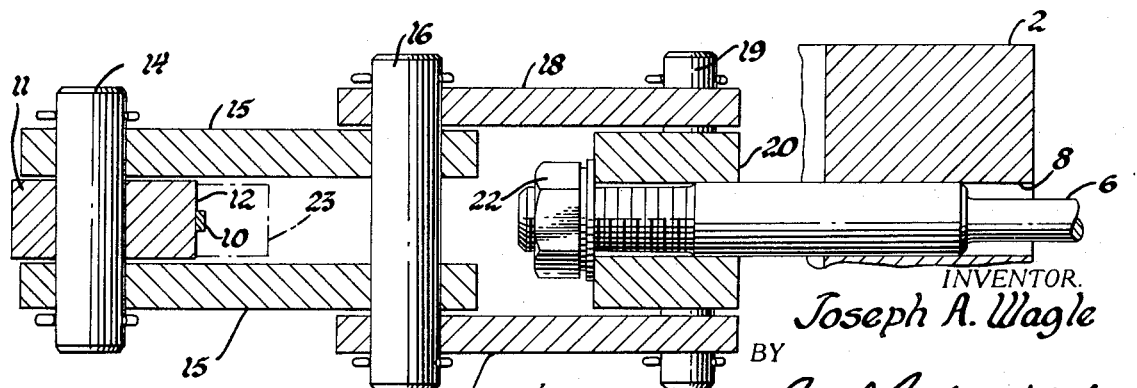
FIG. 3 is a vertical sectional view taken on the plane indicated by the line 3—3 in FIG. 1.
Figure 4:
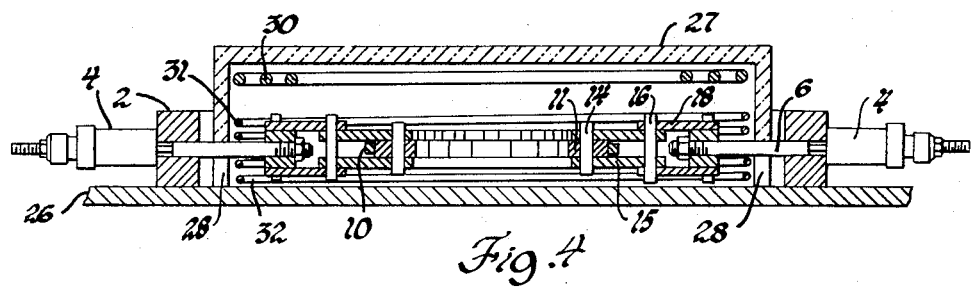
FIG. 4 is a vertical sectional view of the testing device with an arrangement for heating the test piece.

FIG. 4 shows the testing device used in connection with means for heating the specimen being tested. In FIG. 4, the parts are the same as in FIGS. 1 through 3 and therefore are, in the main, unidentified. The entire apparatus is supported on a platform 26 on which the frame 2 rests. The space within the frame is enclosed by the platform 26 and a cover 27 which may be of heat insulating material and which has slots 28 so that the cover can fit down over the piston rods 6. Heating coils 30, 31, and 32 are disposed within the cover and suitably supported by means not illustrated. These coils are preferably electric heaters of the general nature of the well known armored heaters used in domestic ovens and the like. If desired, a coil consisting of a tube through which a hot liquid is circulated might be employed, or other heating means wherever it seems desirable in a given case. The heating means does not affect the operation of the testing device and makes it possible to determine the effect of temperature on burst strength or elastic modulus of the ring.

Figure 5:
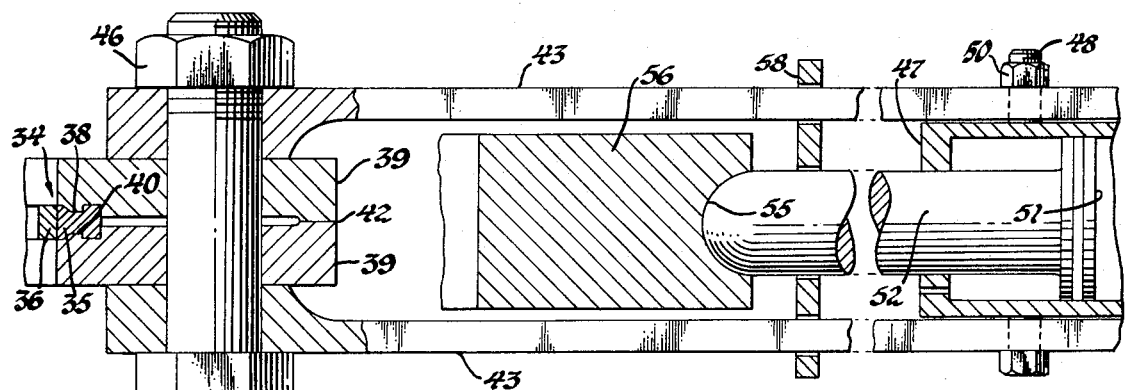
FIG. 5 is a fragmentary radial sectional view of a second form of testing device.
Figure 6:
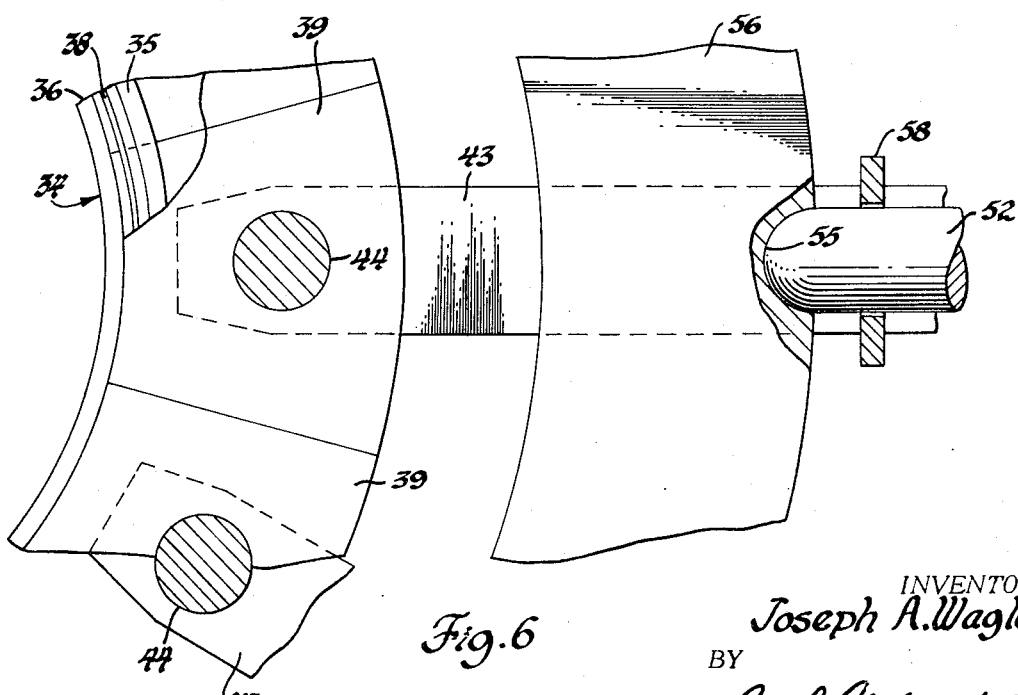
FIG. 6 is a partial plan view of the device of FIG. 5.

FIGS. 5 and 6 illustrate a device for testing rings which differs from that previously described, both in the force applying means and in the fact that it is arranged for grasping the ring to be tested in such manner that the pull on the ring is concentrated in the radially outer fibers so that tests of the resistance of the ring to separation may be made. In FIGS. 5 and 6, the rind 34 to be tested comprises a radially outer ring or layer 35 and a radially inner ring or layer 36. The outer layer has an annular groove 38 in each face. The outer ring is gripped between two arcuate clamping blocks or jaws 39 of the form shown in FIGS. 5 and 6, having an arcuate ridge 40 which is dimensioned to enter the groove 38 of the ring. The blocks 39 abut at their outer edge as indicated at 42 in FIG. 5. They are impinged between the inner ends of two links or pull rods 43 which are clamped together against the blocks 39 by a bolt 44 and nut 46. Each pair of pull rods 43 are fixed to the wall of a hydraulic cylinder 47 by suitable means such as studs 48 and nuts 50. Cylinder 47 mounts a piston which has a piston rod 52 having a hemispherical end. The ends of the piston rods are received in correspondingly shaped pits 55 in an annular frame 56 which corresponds in function to the frame 2. A yoke 58 may be provided to further resist any rocking movement of the cylinder. The yoke 58 slidably encloses the pull rods 43 and piston rod 52. In this form of the device, the layer 35 is clamped and a force is exerted radially outward on this layer tending to stretch the overall ring 34. If there is separation between the two ring layers 35 and 36, this may readily be noted. Thus, this form of device may be used to test adhesion, among other things.

Figure 2:
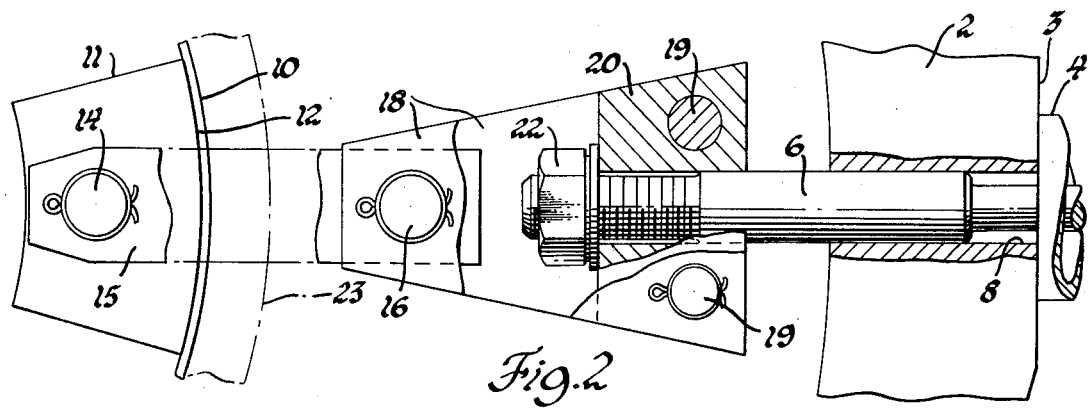
FIG. 2 is an enlarged view of a portion of FIG. 1.

It will be apparent that a gripping device as shown in FIG. 5 might be incorporated with the pulling structure of FIGS. 1, 2, and 3 and, correspondingly, the pulling structure of FIGS. 5 and 6 might be used with a shoe fitting inside a ring to be tested as in the other form illustrated. Also, the cylinders might be mounted inside the frame 2 or 56, but this is not preferred.

It should be apparent to those skilled in the art from the foregoing description that my invention provides a simple and practical device for expansion testing of rings. It is considered to be particularly useful in testing of composite materials such as fiber reinforced materials.

The detailed description of preferred embodiments of the invention for the purpose of explaining the principles thereof is not to be considered as limiting or restricting the invention, as many modifications may be made by the exercise of skill in the art.

I claim:

1. Apparatus for stretch-testing rings by application of radial forces to the rings comprising, in combination, a ring-shaped frame, a plural number of jacks distributed around the exterior of the frame, each jack comprising two force-transmitting parts relatively movable radially of the frame, one of the said parts bearing against the exterior of the frame and the other part extending to the interior of the frame, and force-applying means on the said other parts each configured to apply force in a radially outward direction to a segment of the ring, the force-applying means having surfaces engaging the ring substantially conforming in curvature to the curvature of the ring and being of such extent that the force-applying means engage the major portion of the circumference of the ring.

2. Apparatus for stretch-testing rings by application of radial forces to the rings comprising, in combination, a ring-shaped frame, a plural number of jacks distributed around the exterior of the frame, each jack comprising two force-transmitting parts relatively movable radially of the frame, one of the said parts bearing against the exterior of the frame and the other part extending to the interior of the frame, and force-applying shoes on the said other parts each configured to apply force in a radially outward direction to the interior surface of a segment of the ring, the force-applying shoes having arcuate outer surfaces for engaging the inner surface of the ring, the arcuate surfaces substantially conforming in curvature to the interior of the ring and being of such extent that the shoes engage the major portion of the circumference of the inner surface of the ring.

3. Apparatus for stretch-testing rings by application of radial forces to the rings comprising, in combination, a ring-shaped frame, a plural number of jacks distributed around the exterior of the frame, each jack comprising two force-transmitting parts relatively movable radially of the frame, one of the said parts bearing against the exterior of the frame and the other part extending to the interior of the frame, and force-applying gripping means on the said other parts each adapted to clamp onto the radially outer portion of the side faces of the ring and apply force in a radially outward direction directly to the radially outer portion of a segment of the ring, the gripping means including jaws having arcuate surfaces substantially corresponding in curvature to the ring for engaging the side faces of the ring, and the jaws being of such extent circumferentially of the ring as to engage the major portion of the circumference of the ring.

* * * * *